US009922034B2

United States Patent
Bastide et al.

(10) Patent No.: US 9,922,034 B2
(45) Date of Patent: *Mar. 20, 2018

(54) DISPLAYING AT LEAST ONE CATEGORIZED MESSAGE BASED ON A PERCENTAGE

(71) Applicant: International Business Machines Corporation, Armonk, NY (US)

(72) Inventors: Paul R. Bastide, Boxford, MA (US); Sean Callanan, Dublin (IE); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/823,611

(22) Filed: Aug. 11, 2015

(65) Prior Publication Data

US 2016/0171076 A1 Jun. 16, 2016

Related U.S. Application Data

(63) Continuation of application No. 14/567,545, filed on Dec. 11, 2014.

(51) Int. Cl.
*G06F 3/048* (2013.01)
*G06F 17/30* (2006.01)
*H04L 12/58* (2006.01)

(52) U.S. Cl.
CPC .. *G06F 17/30082* (2013.01); *G06F 17/30713* (2013.01); *H04L 51/22* (2013.01)

(58) Field of Classification Search
CPC ...... G06F 3/04886; G06F 2203/04803; G06Q 10/10; G06Q 10/107; H04L 51/04; H04L 51/046; H04L 51/22

See application file for complete search history.

(56) References Cited

U.S. PATENT DOCUMENTS

| 2007/0168448 | A1* | 7/2007 | Garbow | H04L 12/1831 709/207 |
| 2009/0144655 | A1* | 6/2009 | Hardy | H04L 51/22 715/803 |
| 2010/0235367 | A1 | 9/2010 | Chitiveli et al. | |
| 2012/0054132 | A1 | 3/2012 | Aberdeen et al. | |
| 2014/0040819 | A1* | 2/2014 | Duffy | G06F 9/4443 715/789 |
| 2015/0186494 | A1* | 7/2015 | Gilad | G06F 17/30598 707/740 |

FOREIGN PATENT DOCUMENTS

JP 2006235852 A 9/2006

* cited by examiner

*Primary Examiner* — Claudia Dragoescu
(74) *Attorney, Agent, or Firm* — Steven L. Nichols; Fabian VanCott (57) ABSTRACT

Displaying at least one categorized message based on a percentage includes retrieving a number of messages, categorizing at least one message from the number of messages into at least one category to create categorized messages, identifying a percentage, the percentage representing a portion of a display utilized for displaying the at least one category associated with the categorized messages, determining, based on the percentage, at least one of the categorized messages to present in the portion of the display, and presenting, in the portion of the display, the at least one of the categorized messages.

18 Claims, 9 Drawing Sheets

| Server 500 | | |
|---|---|---|
| Message Number 501 | Message Sender 502 | Message Subject 503 |
| One 501-1 | Sender A 502-1 | Subject One 503-1 |
| Two 501-2 | Sender A 502-2 | Subject Two 503-2 |
| Three 501-3 | Sender B 502-3 | Subject Three 503-3 |
| Four 501-4 | Sender C 502-4 | Subject Four 503-4 |
| Five 501-5 | Sender D 502-5 | Subject Five 503-5 |
| Six 501-6 | Sender D 502-6 | Subject Six 503-6 |
| Seven 501-7 | Sender E 502-7 | Subject Seven 503-7 |
| Eight 501-8 | Sender F 502-8 | Subject Eight 503-8 |
| Nine 501-9 | Sender G 502-9 | Subject Nine 509-9 |
| Ten 501-10 | Sender H 502-10 | Subject Ten 503-10 |

*Fig. 5*

| Message Number 601 | Message Sender 602 | Message Subject 603 | Message Category 604 | |
|---|---|---|---|---|
| One 601-1 | Sender A 602-1 | Subject 1 603-1 | Category A 604-1 | |
| Two 601-2 | Sender A 602-2 | Subject 2 603-2 | Category A 604-2 | |
| Three 601-3 | Sender B 602-3 | Subject 3 603-3 | Category A 604-3 | 612-1 |
| Seven 601-7 | Sender E 602-7 | Subject 7 603-7 | Category A 604-7 | |
| Eight 601-8 | Sender F 602-8 | Subject 8 603-8 | Categories A, B 604-8 | |
| Nine 601-9 | Sender G 602-9 | Subject 9 609-9 | Category A 604-9 | |
| Four 601-4 | Sender C 302-4 | Subject 4 603-4 | Category B 604-4 | 612-2 |
| Five 601-5 | Sender D 302-5 | Subject 5 603-5 | Category B 604-5 | |

Display 600 — 610

*Fig. 6*

| Display 700 | | | |
|---|---|---|---|
| Message Number 701 | Message Sender 702 | Message Subject 703 | Message Category 704 |
| One 701-1 | Sender A 702-1 | Subject 1 703-1 | Category A 704-1 |
| Two 701-2 | Sender A 702-2 | Subject 2 703-2 | Category A 704-2 |
| Three 701-3 | Sender B 702-3 | Subject 3 703-3 | Category A 704-3 |
| Seven 701-7 | Sender E 702-7 | Subject 7 703-7 | Category A 704-7 |
| Eight 701-8 | Sender F 702-8 | Subject 8 703-8 | Categories A, B 704-8 |
| Nine 701-9 | Sender G 702-9 | Subject 9 703-9 | Category A 704-9 |
| Four 701-4 | Sender C 702-4 | Subject 4 703-4 | Category B 704-4 |
| Five 701-5 | Sender D 702-5 | Subject 5 703-5 | Category B 704-5 |
| Ten 701-10 | Sender H 702-10 | Subject 10 703-10 | Category C 704-10 |
| Six 601-6 | Sender D 702-6 | Subject 6 703-6 | Category B 704-6 |

DISPLAYING AT LEAST ONE CATEGORIZED MESSAGE BASED ON A PERCENTAGE

BACKGROUND

The present invention relates to displaying at least one categorized message, and more specifically to displaying at least one categorized messages based on a percentage.

Networks include a number of servers such as mail servers. The mail servers store information for users. The information may be messages such as electronic mail (email). The messages may include text, data, images, digital media, or combinations thereof. The users may retrieve, via a user device, the messages from the mail server. Further, the user device displays the messages retrieved from the mail server to the user via a display.

BRIEF SUMMARY

A method for displaying at least one categorized message based on a percentage includes retrieving a number of messages, categorizing at least one message from the number of messages into at least one category to create categorized messages, identifying a percentage, the percentage representing a portion of a display utilized for displaying the at least one category associated with the categorized messages, determining, based on the percentage, at least one of the categorized messages to present in the portion of the display, and presenting, in the portion of the display, the at least one of the categorized messages.

A system for displaying categorized messages based on a percentage includes a retrieving engine to retrieve a number of messages, a categorizing engine to categorize at least one message from the number of messages into at least one category to create categorized messages, a receiving engine to receive a policy, the policy representing information related to a percentage, an identifying engine to identify the percentage, the percentage representing the portion of the display utilized for displaying the at least one category associated with the categorized messages, a determining engine to determine, based on the percentage, at least one of the categorized messages to present in the portion of the display, and a presenting engine to present, in the portion of the display, the at least one of the categorized messages.

A computer program product includes a computer readable storage medium, the computer readable storage medium having computer readable program code embodied therewith. The computer readable program code having computer readable program code to categorize at least one message from a number of messages into at least one category to create categorized messages, identify a percentage, the percentage representing a portion of a display utilized for displaying the at least one category associated with the categorized messages, determine, based on the percentage, at least one of the categorized messages to present in the portion of the display, and present, in the portion of the display, the at least one of the categorized messages.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for displaying categorized messages based on a percentage, such that a user may view a specific number of categorized messages per category in a portion of a display.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or blocks or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, users may retrieve, via a user device, messages from a server such as a mail server. The user device displays the messages retrieved from the mail server to the user via a display. Further, the messages may be displayed, via the display, in an inbox, on a social wall, through an activity stream, on a timeline, or on a user profile. The messages may be displayed via various methods. In an example, a method displays most recent messages at a top of the display. In another example, a method displays unread messages at the top of the display.

Often, hundreds of messages may be retrieved and displayed to a user. The methods above necessitate a user to manually traverse through all the messages to select a message related to current activities. Manually traversing through all the messages may cause a user to spend additional time on low priority messages and may reduce the attention provided to high priority messages. As a result, manually traversing through hundreds of messages may be a burdensome task for a user.

The principles described herein include a system and a method for displaying at least one categorized message based on a percentage. A system and method may include retrieving a number of messages, categorizing at least one message from the number of messages into at least one category to create categorized messages, identifying a percentage, the percentage representing a portion of a display utilized for displaying the at least one category associated with the categorized messages, determining, based on the percentage, at least one of the categorized messages to present in the portion of the display, and presenting, in the portion of the display, the at least one of the categorized messages. Such a system and method allow a user to view categorized messages in according to the percentage. As a result, this aids the user to focus on more relevant messages.

In the specification and appended claims, the term "message" means data being directed towards a user. In an example, a message may include data such as text, images, digital media, or combinations thereof. A message may be delivered synchronously or may be delivered asynchronously to a user. Further, a message may be stored on a system or server to be retrieved at an interval determined by the user. In an example, a message may be delivered via a push system, where a sending system delivers the message to the user. In other examples, a message may be delivered via a pull system, where a user retrieves messages from a server or other sources.

In the specification and appended claims, the term "display" means a mechanism for presenting categorized messages to a user. In an example, a display may be a monitor that displays a window management system. The window management system may include a number of windows to simultaneously display a variety of information to a user. A portion of the display may be used to present categorized messages. The portion of the display may contain a number of sections. Each section may be used to present categorized messages associated with a category.

In the specification and appended claims, the term "categorized messages" means a grouping of a number of messages into at least one category. In an example, messages may be categorized in more than one category. A category may include a common topic or task. Further, a category may include more than one categorized messages. As a result, categorized messages may indicate messages grouped according to a common topic or task.

In the specification and appended claims, the term "section" means an area within a portion of a display. In an example, a section may be a contiguous area of the display wherein categorized messages associated with a category are presented.

In the specification and appended claims, the term "policy" means information that may be used to identify a percentage. The information may define the percentage, or may be used to influence a percentage. Further, a number of policies to be used to identify the percentage.

In the specification and appended claims, the term "portion of a display" means as an area of a display dedicated to presenting categorized messages. A portion of a display may be displayed as a window by a window manager, or may be displayed as a portion of a window. A portion of a display may consume the entire display. In an example, the portion of the display may be related to a percentage. For example, if the percentage is fifty percent, the portion of the display may be fifty percent of the entire display. Further, the portion of the display may include a number of sections.

As used in the present specification and in the appended claims, the term "a number of" or similar language may include any positive number, including one to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
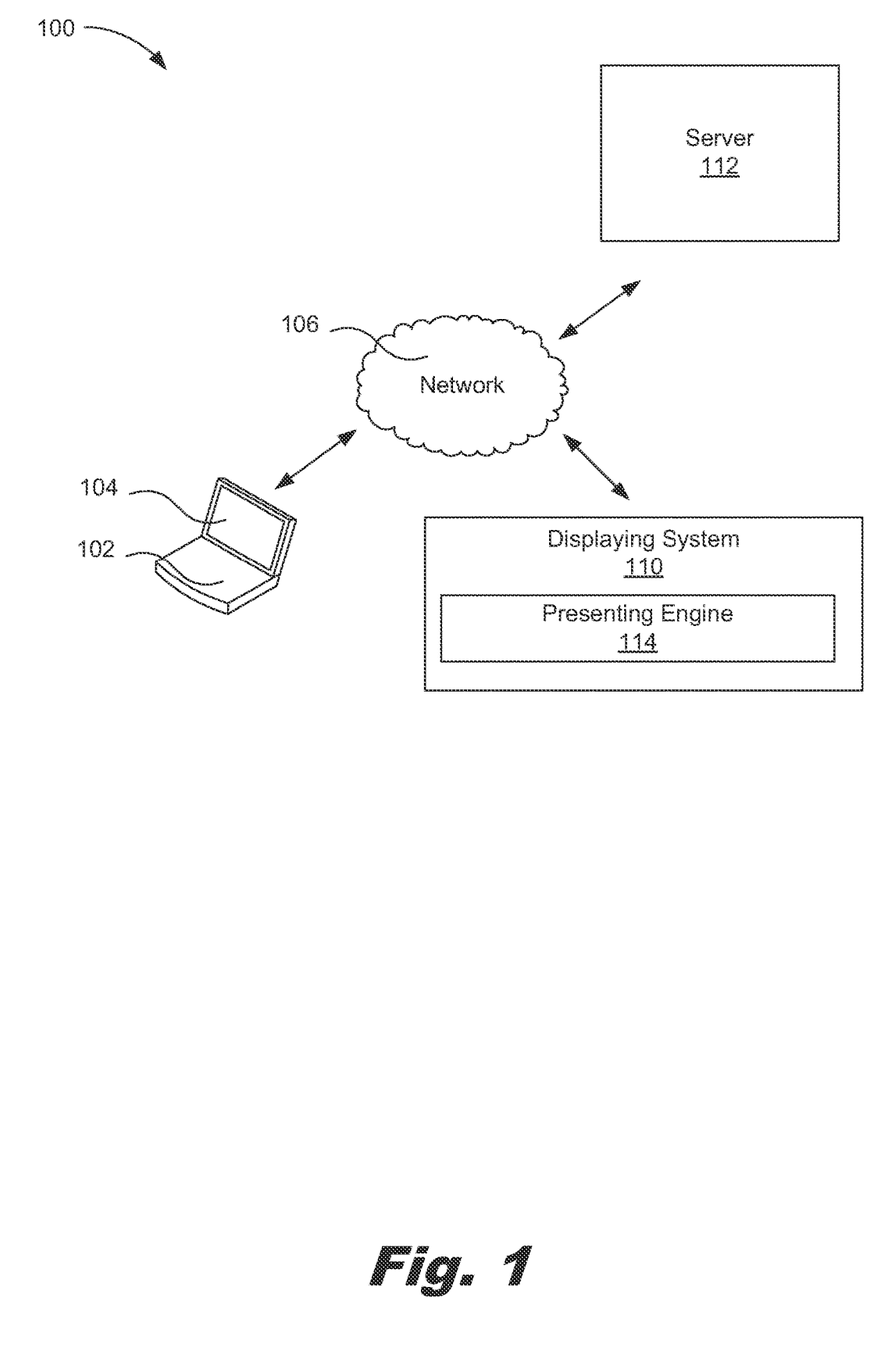
FIG. 1 is a diagram of an example of a system for displaying at least one categorized message based on a percentage, according to one example of the principles described herein.

Referring now to the figures, FIG. 1 is a diagram of an example of a system for displaying at least one categorized message based on a percentage, according to one example of principles described herein. As will be described below, a displaying system is in communication with a network to retrieve a number of messages. The displaying system further categorizes at least one of the messages from the number of messages into at least one category to create categorized messages. The displaying system identifies a percentage, the percentage representing a portion of a display utilized for displaying the at least one category associated with the categorized messages. The displaying system determines, based on the percentage, at least one of the categorized messages to present in the portion of the display. The displaying system presents, in the portion of the display, the at least one of the categorized messages.

As illustrated in FIG. 1, the system (100) includes a server (112). In one example, the server (112) may be a mail server. The server (112) may store, in memory, a number of messages, such as electronic mail (email) for a user. In another example, the server (112) may receive messages from a number of sources. The servers (112) may store the messages in memory or on a device such as a hard disk drive. In yet another example, the server (112) may be a messaging server, providing a storage device wherefrom a user may retrieve messages. As will be described below, the displaying system (110) may retrieve messages from the server (112).

As illustrated in FIG. 1, the system (100) includes a displaying system (110). The displaying system (110) is in communication with a network (106) to retrieve a number of messages. In one example, the message represents email stored on the server (112). Further, the message may include data to be delivered to the user. As will be described in other parts of this specification, the displaying system (110) may retrieve several messages from the server (112).

The displaying system (110) further categorizes at least one message from the number of messages into at least one category to create categorized messages. Each of the categories may include common topics. In one example, the displaying system (110) may categorize the messages into two categories.

The displaying system (110) identifies a percentage, the percentage representing a portion of a display (104) utilized for displaying the at least one category associated with the categorized messages. In one example, the percentage may indicate seventy percent of the display (104) may be used to display categorized messages associated with a first category in a first section of the portion of the display (104). Further, the percentage indicates thirty percent of the display (104) may be used to display categorized messages associated with a second category in a second section of the portion of the display (104). In another example, the percentage may indicate sixty percent of the display (104) may be used to display categorized messages associated with a first category in a first section of the portion of the display (104). Twenty-five percent of the display (104) may be used to display categorized messages associated with a second category in a second section of the portion of the display (104). Fifteen percent of the display (104) may be used to display categorized messages associated with a third category in a third section of the portion of the display (104).

The displaying system (110) determines, based on the percentage, at least one of the categorized messages to present in the portion of the display. The displaying system (110) may determine a number of categorized messages associated with a category to be displayed. This determination may be made based on a number of factors. The number of factors may include the time the message was sent or received or a scoring to calculate an intended priority for the message.

Further, the displaying system (110) presents, in the portion of the display, at least one of the categorized messages. The categorized messages may be presented in the sections associated with the portion of the display. The displaying system (110) may present the categorized messages using a variety of fonts, font sizes, colors, and margins. The presenting may present limited information about the categorized message, which may include a link to the complete categorized message.

While this example has been described with reference to the displaying system being operated over the network, the displaying system may be stored and operated locally on a single machine. For example, the displaying system may be integrated into a user or client device, a server, a database, other locations, or combinations thereof.

Figure 2:
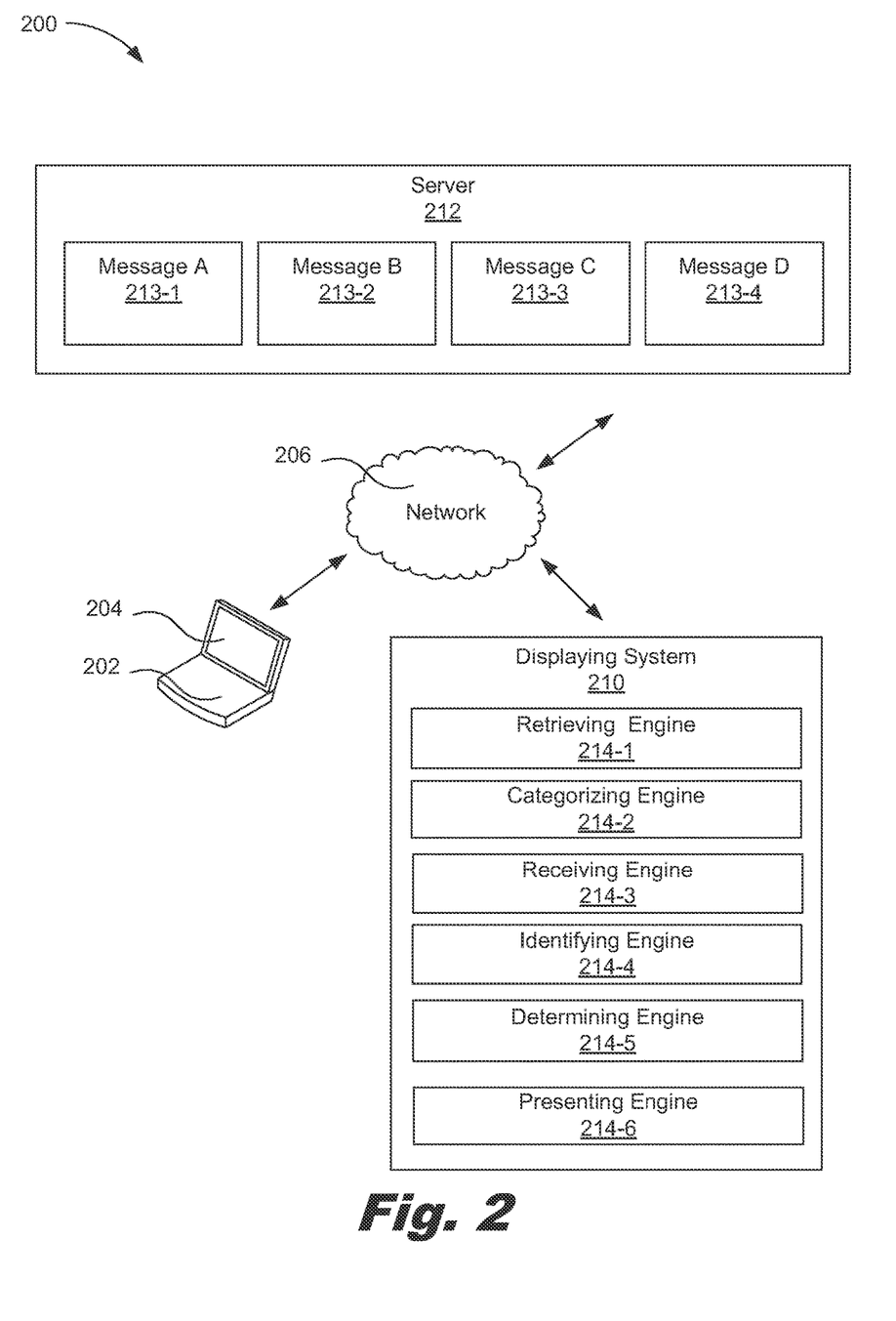
FIG. 2 is a diagram of an example of a system for displaying at least one categorized message based on a percentage, according to one example of the principles described herein.

FIG. 2 is a diagram of an example of a system for displaying at least one categorized message based on a percentage, according to one example of principles described herein. As will be described below, a displaying system is in communication with a network to retrieve a number of messages. The displaying system further categorizes at least one of the messages from the number of messages into at least one category to create categorized messages. The displaying system identifies a percentage, the percentage representing a portion of a display utilized for displaying the at least one category associated with the categorized messages. The displaying system determines, based on the percentage, at least one of the categorized messages to present in the portion of the display. The displaying system presents, in the portion of the display, the at least one of the categorized messages.

As illustrated in FIG. 2, the system (200) includes a server. The server (212) may be an email server, a social network server, an instant message server, message passing server, or other type of server. Further, the server (212) stores messages (213) such as email messages. In the example, the server (212) stores message A (213-1), message B (213-2), message C (213-3) and message D (213-4) as email messages. As will be described below, a displaying system (210) may retrieve the messages (213).

As illustrated, the system (200) includes a displaying system (210). The displaying system (210) may contain a number of engines (214). The engines (214) refer to a combination of hardware and program instructions to perform a designated function. Each of the engines (214) may include a processor and memory. The program instructions are stored in the memory and cause the processor to execute the designated function of the engine. As illustrated, the displaying system (210) includes a retrieving engine (214-1), a categorizing engine (214-2), a receiving engine (214-3), an identifying engine (214-4), a determining engine (214-5), and a presenting engine (214-6).

As mentioned above, the displaying system (210) includes a retrieving engine (214-1). The retrieving engine (214-1) retrieves a number of messages (213). In an example, the retrieving engine (214-1) may initiate communication with a server (212). In another example, the server (212) may initiate communication with the displaying system (210) to deliver messages to the displaying system (210). In an example, the retrieving engine (214-1) may specify criteria for messages to be retrieved. In one example, the retrieving engine (214-1) may retrieve messages (213) that were delivered during a time period. The time period may be from a present time to a time a message was last retrieved. Further, the time period may be a specified time period, such as beginning at midnight on a specific day and ending at midnight on a specific day. In an example, the retrieving engine (214-1) may control the messages retrieved by transmitting criteria to the server (212), or may control by retrieving a number of messages and then filtering the messages before further processing by the displaying system (210).

As illustrated, the displaying system (210) includes the categorizing engine (214-2). The categorizing engine (214-2) categorizes at least one message from the number of messages (213) into at least one category to create categorized messages. Each message (213) may be categorized based on factors such as the sender, the subject of the message, and/or the content of the message. Attributes of each message may be compared against attributes of a category. A message may also be compared against prior messages that have been categorized. Further, a user may specify attributes of messages (213) for a category to reclassify the messages into specific categories.

As mentioned above, the displaying system (210) includes a receiving engine (214-3). In an example, the receiving engine (214-3) receives a policy, the policy containing information that may be used to identify a percentage. The policy may dictate the exact values of the percentage or the policy may be used as a factor in identifying the percentage. In an example, a single policy may be used to identify a percentage. Further, a number of policies may be used to identify a percentage. In an example, the policies may be stored in memory on a user device (202), the displaying system (210), the server (212), or combinations thereof. Further, the policies may be associated with specific users. As a result, the receiving engine (214-3) may receive policies for specific users.

As illustrated, the displaying system (210) an identifying engine (214-4). The identifying engine (214-4) identifies a percentage, the percentage representing a portion of a display (204) utilized for displaying the at least one of the categorized messages to present in the portion of the display (204). In an example, a user may be limited by an amount of information that can be displayed on the display (204). Further, a user device (202) may include a single display, or may use a number of displays. A single display may be divided into a number of sections, with each section emulating a physical display (204). The percentage may indicate a portion of a display (204), the display being either physical or virtual, for displaying categorized messages associated with a category. In one example, the user device (202) may use a window to emulate a display. In an example, the percentage indicates fifty percent of the entire display is dedicated to displaying the categorized messages.

As mentioned above, the displaying system (210) includes a determining engine (214-5). The determining engine (214-5) determines, based on the percentage identified, at least one of the categorized messages to present in the portion of the display. In an example, a category that has more categorized messages associated with it than can be displayed in the portion of the display (204) may determine which of the categorized messages are to be presented in the portion of the display (204). The determining engine (214-5) determines categorized messages to display based on the time the message (213) was sent, or on the message sender.

As mentioned above, the displaying system (210) includes a presenting engine (214-6). The presenting engine (214-6) presents, in the portion of the display, at least one of the categorized messages. The presenting engine (214-6) may provide formatting to present a categorized message on a display (204). The presenting engine (214-6) may present the categorized messages in a format to allow the user's system (202) to present the message in an aesthetically pleasing manner. As will be described in other parts of this specification, the presenting engine (214-6) presents the categorized messages in sections associated with the portion of the display. Each of the sections may be associated with a category.

An overall example of FIG. 2 will now be described. In one example, a user device (202) initiates a request to the displaying system (210) to display a number of messages to the user on the display (204). The displaying system (210) invokes the retrieving engine (214-1). The retrieving engine (214-1) retrieves message A (213-1), message B (213-2), message C (213-3), and message D (213-4). The categorizing engine (214-2) categorizes the message into two categories. Message A (213-1), message B (213-2), and message C (213-3) are associated with a first category and message D (213-4) is associated with a second category. The identifying engine (214-4) identifies a percentage. In an example, the percentage represents a portion of the display (204) that each section may use to display categorized messages. The first category may be allowed to consume seventy-five percent of the display (204) in a first section of the portion of the display (204) and the second category may be allowed to consume twenty-five percent of the display (204) in a second section of the portion of the display (204). The determining engine (214-5) determines which of the categorized messages from the number of categories displayed based on the number of categorized messages and the percentage. In this example, the display presents four categorized messages. The first category was identified to consume seventy-five percent of the display (204) in the first section. As a result, three categorized messages may be displayed in the first section. The determining engine (214-5) determines which categorized messages are to be displayed. In this example, message A (213-1), message B (213-2), and message C (213-3) are displayed as categorized messages in the first category associated with the first section. Message D (213-4) is displayed as a categorized message in the second category associated with the second section. The presenting engine (214-5) presents, in the portion of the display (204), message A (213-1), message B (213-2), and message C (213-3) as categorized messages in the first section. The presenting engine (214-5) presents, in the portion of the display (204) message D (213-4) as a categorized message in the second section. More information about presenting categorized messages in a portion of a display will be described in later parts of this specification.

Figure 3:
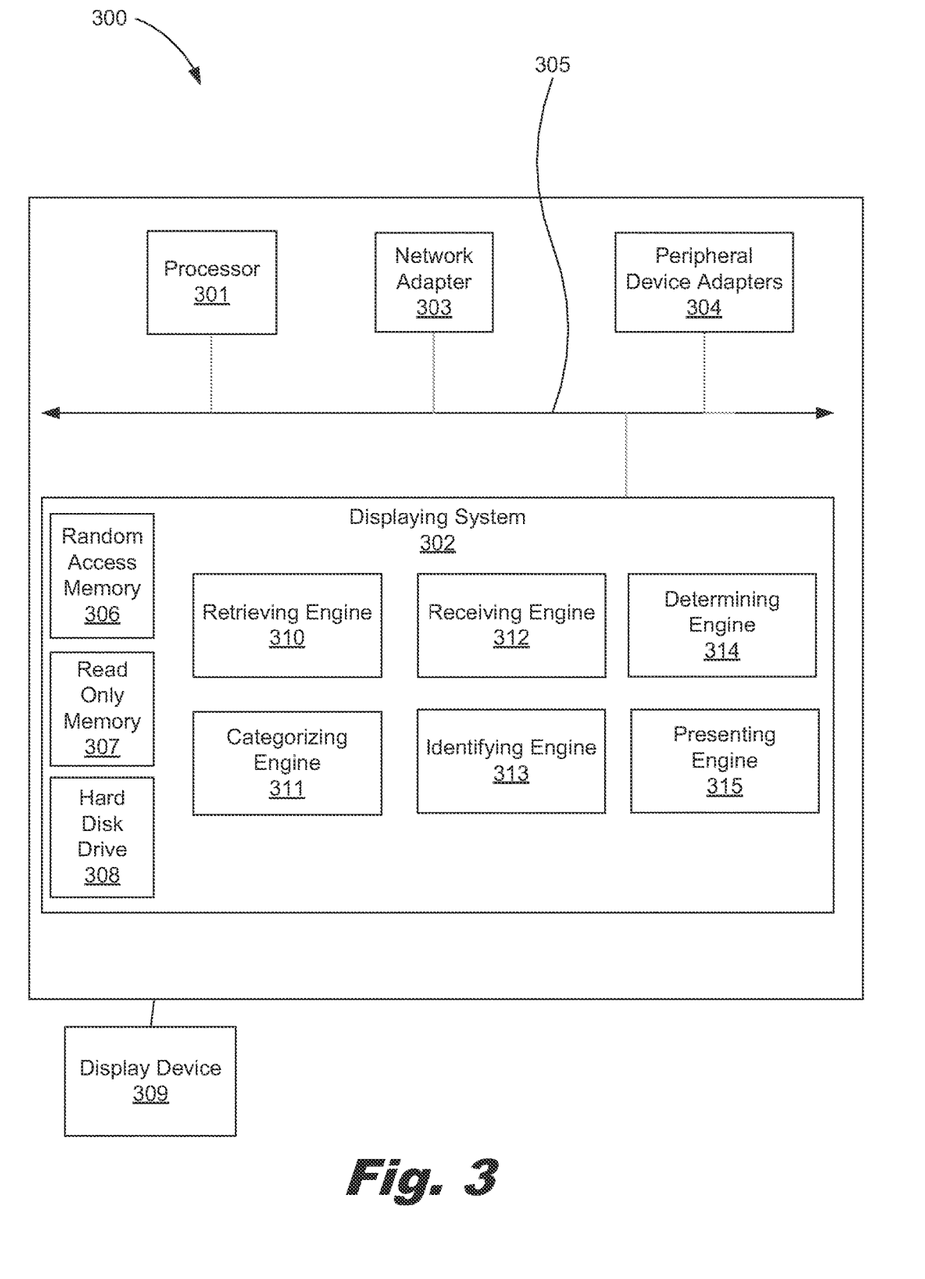
FIG. 3 is a diagram of an example of a computer program product for displaying at least one categorized message based on a percentage, according to the principles described herein.

FIG. 3 represents a computing device for displaying at least one categorized message based on a percentage, according to one example of the principles described herein. The computing device (300) for managing data in a distributed computing environment may be implemented in an electronic device. Examples of electronic devices include servers, desktop computers, laptop computers, personal digital assistants (PDAs), mobile devices, smartphones, gaming systems, and tablets, among other electronic devices.

The computing device (300) may be utilized in any data-processing scenario, including stand-alone hardware, mobile applications, a computing network, or combinations thereof. Further, the computer (300) may be used in a computing network, a public cloud network, a private cloud network, a hybrid cloud network, other forms of networks, or combinations thereof. In one example, the methods provided by the computing device (300) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (300) are executed by a local administrator.

To achieve its desired functionality, the computing device (300) may include various hardware components. Among these hardware components may be a number of processors (301), a number of displaying systems (302), a number of peripheral device adapters (304), and a number of network adapters (303). These hardware components may be interconnected through the use of a number of buses and/or network connections. In one example, the processor (301), displaying system (302), peripheral device adapters (304), and a network adapter (303) may be communicatively coupled via a bus (305).

The displaying system (302) may store data, such as executable program code, that is executed by the processor (301) or other processing device. As will be discussed, the displaying system (302) may specifically store computer code representing a number of applications that the processor (301) executes to implement at least the functionality described herein.

The displaying system (302) may include various types of memory modules, including volatile and nonvolatile memory. For example, the displaying system (302) of the present example includes Random Access Memory (RAM) (306), Read Only Memory (ROM) (307), and Hard Disk Drive (HDD) memory (308). Many other types of memory may also be utilized, and the present specification contemplates the use of as many varying type(s) of memory in the displaying system (302) as may suit a particular application of the principles described herein. In certain examples, different types of memory in the displaying system (302) may be used for different data storage needs. For example, in certain examples, the processor (301) may boot from Read Only Memory (ROM) (307), maintain nonvolatile storage in the Hard Disk Drive (HDD) memory (308), and execute program code stored in Random Access Memory (RAM) (306).

Generally, the displaying system (302) may comprise a computer readable medium, a computer readable storage medium, or a non-transitory computer readable medium, among others. For example, the displaying system (302) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (303, 304) in the computing device (300) enable the processor (301) to interface with various other hardware elements, external and internal to the computing device (300). For example, the peripheral device adapters (304) may provide an interface to input/output devices, such as, for example, a display device (309), a mouse, or a keyboard. The peripheral device adapters (303) may also provide access to other external devices, such as an external storage device, a number of network devices such as, for example, servers, switches, and routers, client devices, other types of computing devices, and combinations thereof.

The display device (309) may be provided to allow a user of the computing device (300) to interact with and implement the functionality of the computing device (300). The peripheral device adapters (304) may also create an interface between the processor (301) and the display device (309), a printer, or other media output devices. The network adapter (303) may provide an interface to other computing devices within, for example, a network, thereby enabling the transmission of data between the computing device (300) and other devices located within the network.

The computing device (300) may, when executed by the processor (301), display the number of graphical user interfaces (GUIs) on the display device (309) associated with the executable program code, representing the number of applications stored on the displaying system (302). The GUIs may include aspects of the executable code, including displaying a number of messages to a user. The GUIs may display, for example, fifty percent of the messages from a first category and fifty percent of the messages from a second category. Additionally, a user may control the percentage of the display in which messages from a category may be displayed. Examples of display devices (309) include a computer screen, a laptop screen, a mobile device screen, a personal digital assistant (PDA) screen, and a tablet screen, among other display devices (309). Examples of the GUIs displayed on the display device (309) will be described in more detail below.

The computing device (300) may include a number of engines used in the implementation of the management system for data in a distributed environment. The various modules within the computing device (300) comprise executable program code that may be executed separately. In this example, the various modules may be stored as separate computer program products. In another example, the various modules within the computing device (300) may be combined within a number of computer program products; each computer program product comprising a number of the modules.

The computing device (300) may include a retrieving engine (310) made to, when executed by the processor (301), retrieve a number of messages. A categorizing engine (311) may categorize at least one of the messages from the number of messages into at least one category to create categorized messages. A receiving engine (312) may receive information related to a percentage. An identifying engine (313) may identify a percentage, the percentage representing a portion of a display utilized for displaying the at least one category associated with the categorized messages. A determining engine (314) may determine, based on the percentage, at least one of the categorized messages to present in the portion of the display. A presenting engine (316) may present, in the portion of the display, the at least one of the categorized messages.

The retrieving engine (310) may retrieve a number of messages from a server (FIG. 2, 212). The retrieving engine (310) may provide information to the server (FIG. 2, 212) to identify the messages to retrieve.

The categorizing engine (311) may categorize at least one message from a number of messages into at least one category to create categorized messages. The categorizing engine (311) may use policies, a message subject, information associated with the message, information associated with other categorized messages, the sender, or policy information configured by a user, or similar information to categorize a message.

The receiving engine (312) may receive a policy, the policy representing information related to a percentage. The receiving engine (312) may receive the policy from a user, from a second user associated with the user, or as a system wide policy. A system wide policy may serve as a default policy for a user who has not provided a policy.

The identifying engine (313) may identify a percentage, the percentage representing a portion of a display utilized for displaying the at least one category associated with the categorized messages. The identifying module (313) may identify the percentage based on a setting. The setting may be represented as a configuration value for the system (300). The setting may be a policy structure that is used to identify the percentage for a number of users. The setting may be a single numeric value that is used in identifying the percentage. The setting may be statically determined as part of the computer code that identifies the percentage. The identifying engine (313) may identify the percentage based on data associated with the number of messages. The identifying engine (313) may identify percentages by analyzing information associated with a recipient.

The determining engine (314) may determine, based on the percentage, at least one of the categorized messages to present in the portion of the display. The determining engine (314) may consider factors, such as a timestamp, body of the message, and/or message metadata in determining the messages to present.

The presenting engine (315) may present, in the portion of the display, the at least one of the categorized messages. The presenting engine (315) presents, in the portion of the display, the at least one categorized messages, by ordering the at least one of the categorized messages based on a timestamp.

Aspects of the present system and method are described herein with reference to flowchart illustrations and/or block diagrams of methods, apparatus (systems) and computer program products, according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (301) of the computing device (300) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Figure 4A:
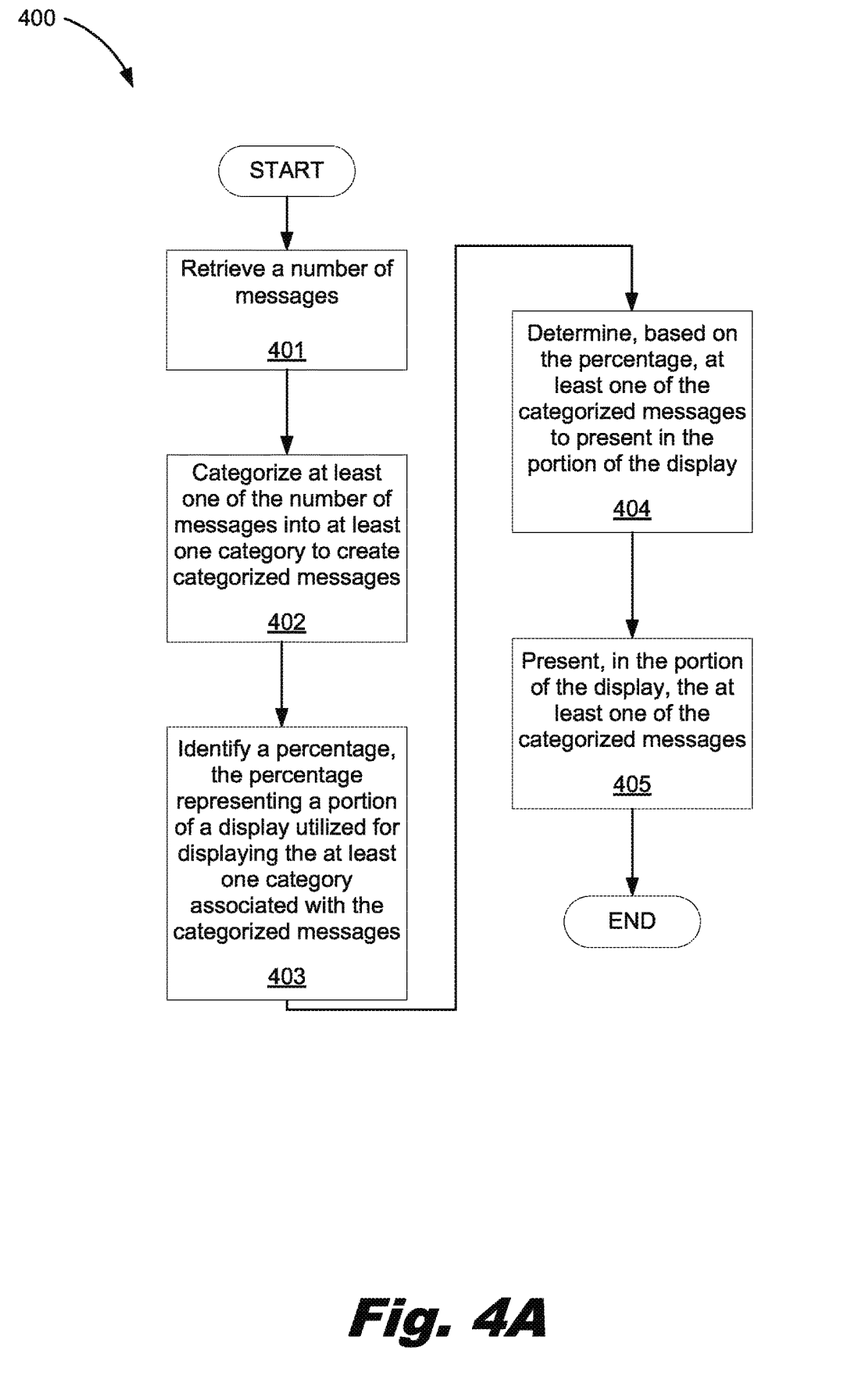
FIG. 4A is a flowchart of an example of a method for displaying at least one categorized message based on a percentage, according to one example of principles described herein.

FIG. 4A is a flowchart of an example of a method for displaying at least one categorized message based on a percentage, according to one example of principles described herein. In one example, the method (400) may be executed by the displaying system (110) of FIG. 1. In other examples, the method (400) may be executed by other systems (i.e. system 200 or system 800). In this example, the method (400) includes retrieving (401) a number of messages, categorizing (402) at least one message from the number of messages into at least one category to create categorized messages, identifying (403) a percentage, the percentage representing a portion of a display utilized for displaying the at least one category associated with the categorized messages, determining (404), based on the percentage, at least one of the categorized messages to present in the portion of the display, and presenting (405), in the portion of the display, the at least one of the categorized messages.

As mentioned above, the method (400) includes retrieving (401) a number of message. The retrieving (401) may retrieve messages from a server (FIG. 2, 212). The retrieving (401) may pass information to the server (FIG. 2, 212) to specify criteria indicating the messages to retrieve. Retrieving (401) the number of messages may include retrieving the number of messages based on a specific time period.

As mentioned above, the method (400) includes categorizing (402) at least one message from the number of messages into at least one category to create categorized messages. The categorizing (402) may assign a message to a single category, or may assign a message to a number of categories.

As mentioned above, the method (400) includes identifying (403) a percentage, the percentage representing a portion of a display utilized for displaying the at least one category associated with the categorized messages. Identifying (403) the percentage representing the portion of the display utilized for displaying the at least one category associated with the categorized messages includes calculating the percentage based on a setting. The setting may include a minimum and/or maximum percentage. If the percentage is above the maximum or below the minimum, the setting decreases or increases the percentage. For example, if the minimum is fifty percent and the method identifies the percentage as forty percent, the percentage is increased to fifty percent. If the maximum is eighty percent and the method identifies the percentage as ninety percent, the percentage is decreased to eighty percent. Identifying (403) a percentage, the percentage representing a portion of a display utilized for displaying the at least one category associated with the categorized messages includes calculating the percentage based on data associated with the number of messages. The data associated with the number of messages may include the recipient of the message. Further, the data associated with the number of messages may include data associated with the recipient of the message.

As mentioned above, the method (400) includes determining (404), based on a percentage, an at least one categorized message to present in the portion of the display. In an example, a percentage may indicate that a section associated with a category is to consume forty percent of the portion of the display.

As mentioned above, the method (400) includes presenting (405), in the portion of the display, the at least one of the categorized messages. The presenting (405) may format the messages using methods such as fonts, font size, colors, and layouts. The presenting (405), in the portion of the display, the at least one of the categorized messages may further include ordering the at least one of the categorized messages based on a timestamp. The presenting (405), in the portion of the display, the at least one of the categorized messages may further include presenting the at least one of the categorized messages via a number of sections associated with the portion.

Figure 4B:
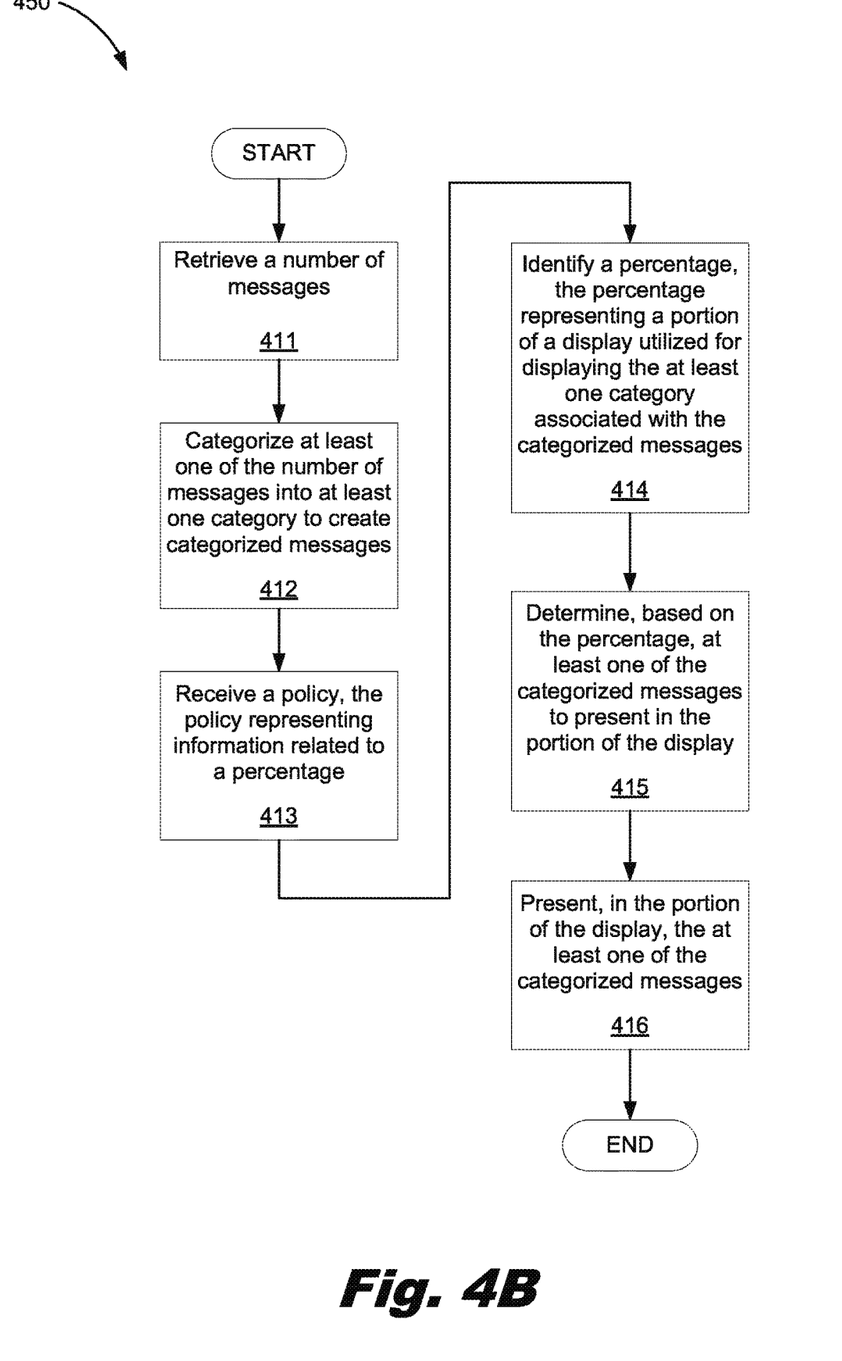
FIG. 4B is a flowchart of an example of a method for displaying at least one categorized message based on a percentage, according to one example of principles described herein.

FIG. 4B is a flowchart of an example of a method for displaying at least one categorized message based on a percentage, according to one example of principles described herein. In one example, the method (450) may be executed by the displaying system (FIG. 1, 110). In other examples, the method (450) may be executed by other systems (i.e. system 200 or system 800). In this example, the method (450) includes retrieving (411) a number of messages, categorizing (412) at least one message from the number of messages into at least one category to create categorized messages, receiving (413) a policy, the policy representing information related to a percentage, identifying (414) the percentage, the percentage representing a portion of a display utilized for displaying the at least one category associated with the categorized messages, determining (415), based on the percentage, at least one of the categorized messages to present in the portion of the display, and presenting (416), in the portion of the display, the at least one of the categorized messages.

As mentioned above, the method (450) may include receiving (413) a policy, the policy representing information related to a percentage. The method (450) may receive a single policy, or may receive a number of policies. The policy received may include a number of categories, information on identifying messages for each category. The policy may be received from the network or the policy may be received from a user on a system. The policy may allow a user of the system to alter the presentation of the messages. The policy may provide information allowing the method (450) to identify a percentage or the policy may specify the percentage.

Figure 5:
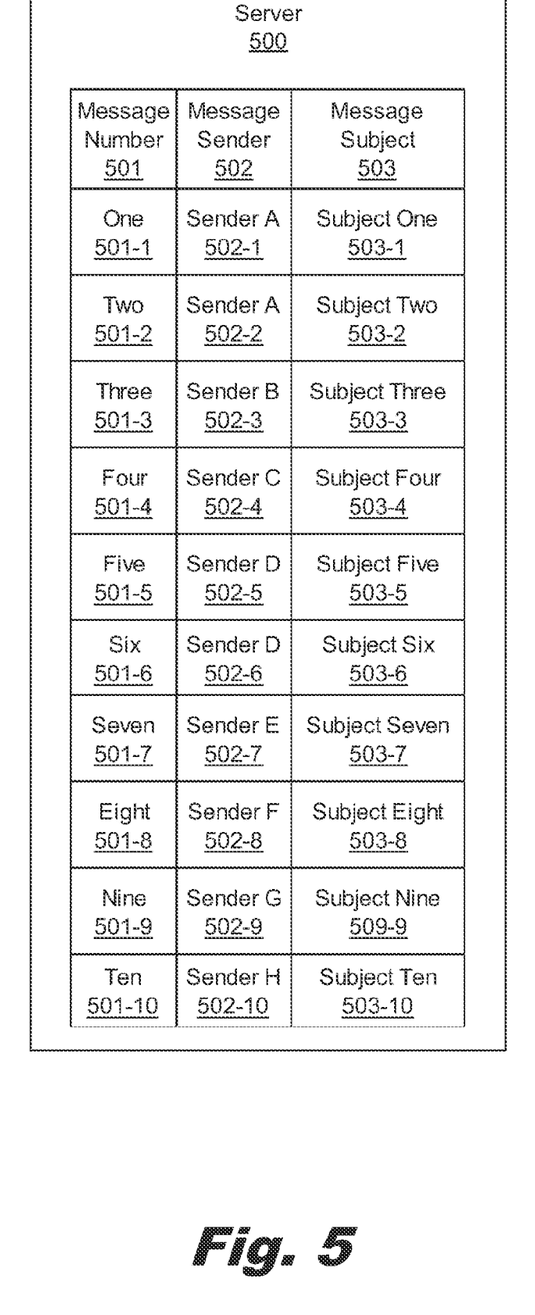
FIG. 5 is a diagram of an example of a number of messages to be retrieved from a server, according to one example of principles described herein.

FIG. 5 is a diagram of a number of messages on a server such as may be retrieved in one example of the principles described herein. As will be described below, a server may store a number of messages. The messages may be associated with a message number, a message sender, and a message subject. Further, a retrieving engine may retrieve the messages.

As illustrated, a server (500) may store a number of messages. The number of messages may be associated with a user. Further, each message may be associated with a message number (501), a message sender (502), and a message subject (503).

The message number (501) may indicate an identification number categorized by the system. The message number (501) may be categorized based on the order the message was received. Further, the message number (501) may be calculated by a message position in a queue on the server (500).

Further, a message may be associated with a message sender (502). The message sender (502) may indicate an email address of the sender that initiated the message. The message sender (502) may indicate sufficient contact information for the user receiving the message to reply to the sender of the message.

Further, a message may be associated with a message subject (503). The message subject (503) may indicate a subject specified by the message sender (502) to alert the recipient of the nature of the message. Further, the message subject (503) may indicate that a message is in response to a prior message.

As illustrated, message one (501-1) may be associated with sender A (502-1) and message subject one (503-1). Message two (501-2) may be associated with sender A (502-2) and message subject two (503-2). Message three (501-3) may be associated with sender B (502-3) and message subject three (503-3). Message four (501-4) may be associated with sender C (502-4) and message subject four (503-4). Message five (501-5) may be associated with sender D (502-5) and message subject five (503-5). Message six (501-6) may be associated sender D (502-6) and message subject six (503-6). Message seven (501-7) may be associated with sender E (502-7) and message subject seven (503-7). Message eight (501-8) may be associated with sender F (502-8) and message subject eight (503-8). Message nine (501-9) may be associated with sender G (502-9) and message subject nine (509-9). Message ten (501-10) may be associated with message sender H (502-10) and message subject ten (503-10).

Figure 6:
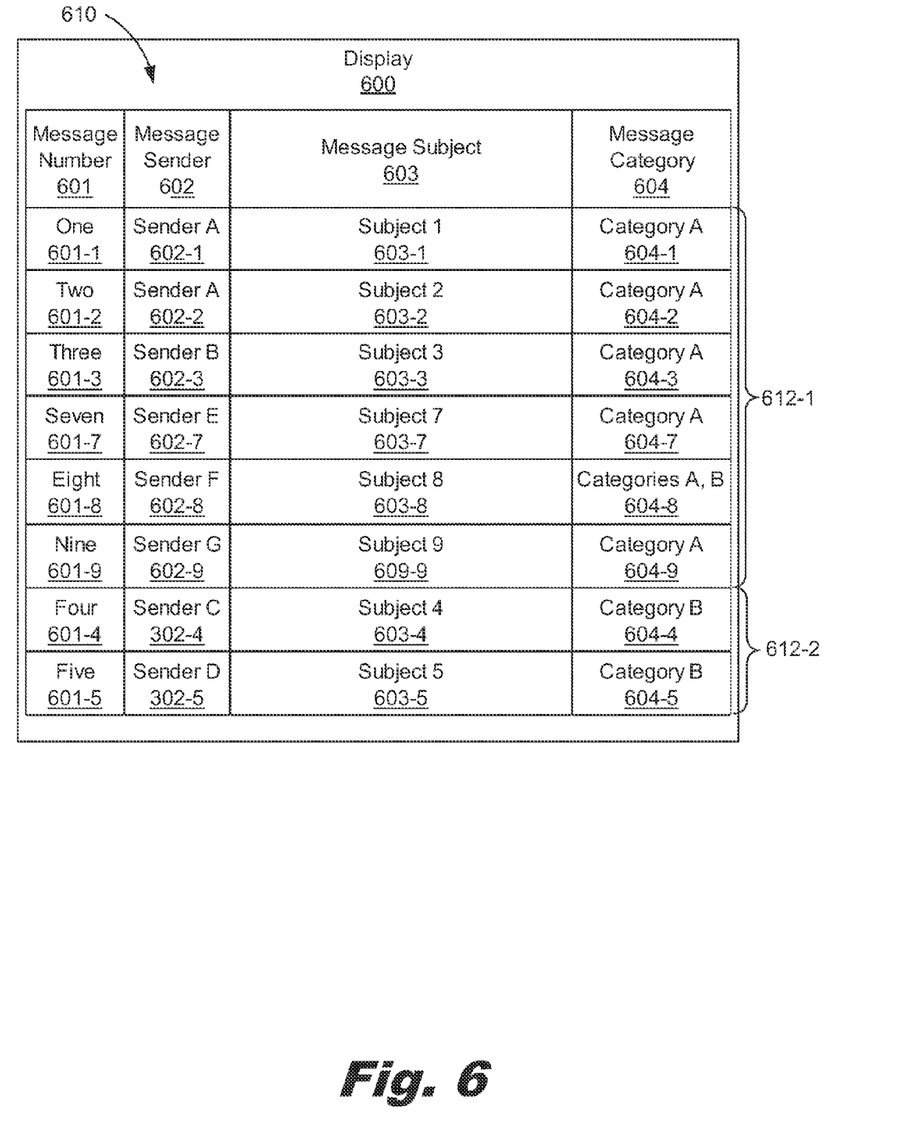
FIG. 6 is a diagram of an example of a first presentation of a number of messages, according to one example of principles described herein.

FIG. 6 is a diagram of a number of categorized messages to be displayed in one example of the principles described herein. As will be described below, a number of categorized messages are presented in sections. The sections may correspond with categories of the categorized messages. Further, all of the sections contribute to the portion of the display.

As illustrated, a display (600) includes a portion (610) of the display (600) that is used to present categorized messages. The display portion (610) includes a first section (612-1) and a second section (612-2). The first section (612-1) presents categorized messages associated with category A. The second section (612-2) presents categorized messages associated with category B.

As mentioned above, the displaying system retrieves a number of messages. Further, a categorizing engine categorizes at least one message from the number of messages into at least one category to create categorized messages. As illustrated, message one (601-1) is categorized to category A (604-1). Message two (601-2) is categorized to category A (604-2). Message three (601-3) is categorized to category A (604-3). Message seven (601-7) is categorized to category A (604-7). Message eight (601-8) is categorized to category A and B (604-8). Message nine (601-9) is categorized to category A (604-9). Message four (601-4) is categorized to category B (604-4). Message five is categorized to category B (604-5). Message six (FIG. 5, 501-6) and message 10 (FIG. 5, 501-10) are not presented. Message six (FIG. 5, 501-6) is categorized to category C. Message 10 (FIG. 5, 501-10) is categorized to category B.

The displaying system identifies a percentage, the percentage representing a portion (610) of a display (600) utilized for displaying the at least of the categorized messages to present in the portion (610) of the display (600). The first section (612-1) has been identified to consume seventy-five percent of the portion (610) of the display (600) for the categorized messages associated with category A. The second section (612-2) has been identified to consume twenty five percent of the portion (610) of the display (600) for the categorized messages associated with category B.

Further, the displaying system determines, based on the percentage identified, at least one of the categorized messages to present in the portion (610) of the display (600). In an example, the portion (610) of the display (600) is able to present eight categorized messages. For example, seventy-five percent of the categorized messages can be presented in the first section (612-1). As a result, the first section (612-1) presents six categorized messages associated with category A. Twenty five percent of the categorized messages can be presented in the second section (612-2). As a result, the second section (612-2) presents two categorized messages associated with category B. The displaying system presents message one (601-1), message two (601-2), message three (601-3), message seven (601-7), message eight (601-8), and message nine (601-9) in a first section (612-1). Message four (601-4) and message five (601-5) are presented in a second section (612-2). Message six (FIG. 5, 501-6) and message ten (FIG. 5, 501-10) are not shown and have been determined not to be presented. By suppressing message ten (FIG. 5, 501-10), the displaying system (FIG. 5, 501-6) can influence the amount of focus category B may receive. By suppressing message six (FIG. 5, 501-6) the displaying system (FIG. 2, 210) may influence the amount of focus on category C.

Figure 7:
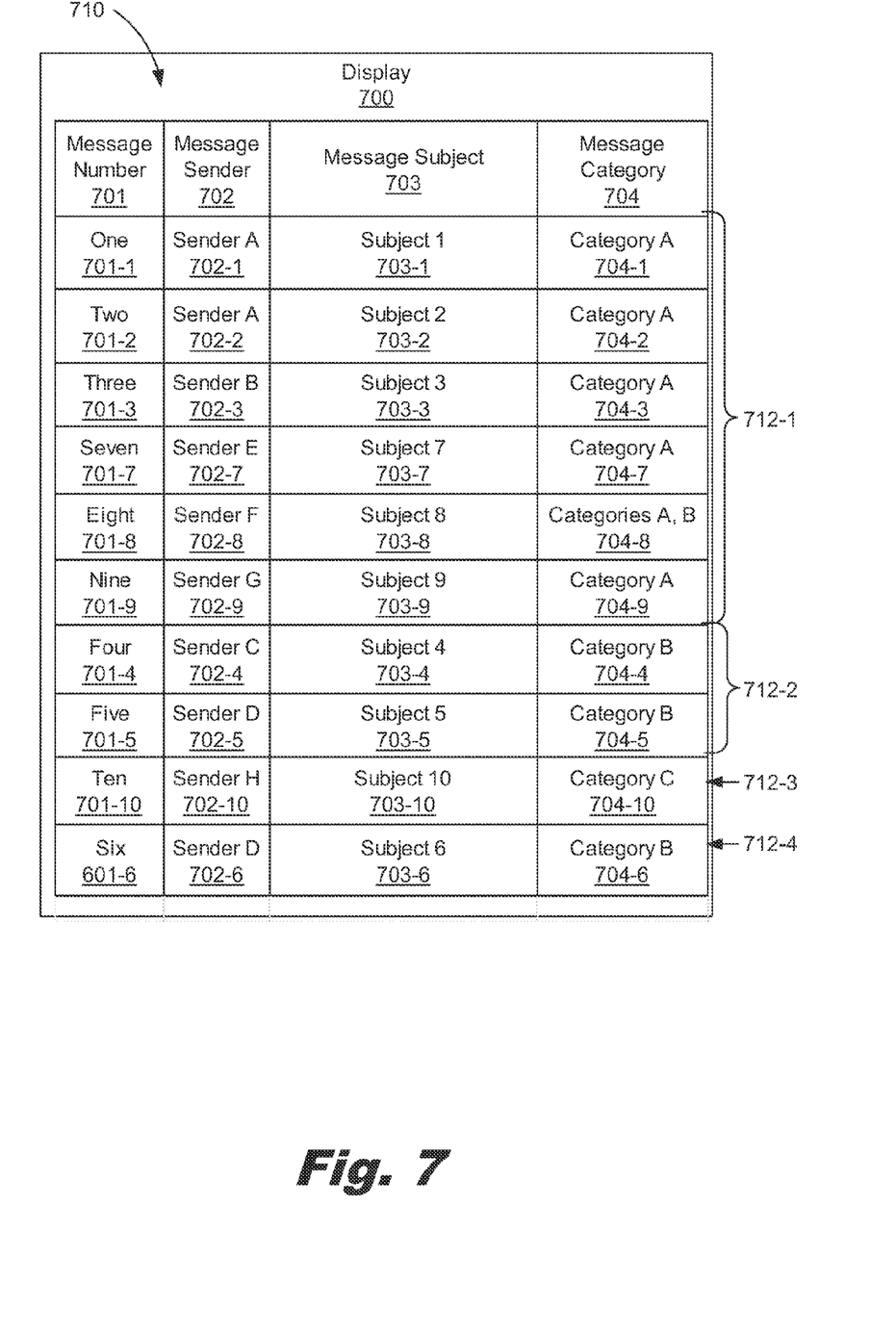
FIG. 7 is a diagram of an example of a second presentation of a number of messages, according to one example of the principles described herein.

FIG. 7 is a diagram of a number of messages that are displayed in one example of the principles described herein. As will be described below, a number of categorized messages are presented in sections. The sections may correspond with categories of the categorized messages. Further, all of the sections contribute to the portion of the display.

As illustrated, a display (700) includes a portion (710) of the display (700) that is used to present categorized messages. The portion (710) includes a first section (712-1), a second section (712-2), a third section (712-3), and a fourth section (712-4). The sections (712) present categorized messages associated with categories.

As mentioned above, the displaying system retrieves a number of messages. Further, a categorizing engine categorizes at least one message from the number of messages into at least one category to create categorized messages. As illustrated, message one (701-1) is categorized to category A (704-1). Message one (701-1) is categorized to category A (704-1). Message two (701-2) is categorized to category A (704-2). Message three (701-3) is categorized to category A (704-3). Message seven (701-7) is categorized to category A (704-7). Message eight (701-8) is categorized to category A, B (704-8). Message nine (701-9) is categorized to category A (704-9). Message four (701-4) is categorized to category B 7604-4). Message five is categorized to category B (704-5). Message six (701-6) is categorized to category B (704-6). Message ten (701-10) is categorized to category C (704-10).

As mentioned above, the displaying system identifies a percentage, the percentage representing a portion (710) of a display (700) utilized for displaying the at least one of the categorized messages to present in the portion of the display (700). The first section (712-1) has been identified to consume sixty percent of the portion (710) of the display (700) for the categorized messages associated with category A. The second section (712-2) has been identified to consume twenty percent of the portion (710) of the display (700) for the categorized messages associated with category B. The third section (712-3) has been identified to consume ten percent of the portion (710) of the display (700) for the categorized messages associated with category C. The fourth section (712-3) has been identified to consume ten percent of the portion (710) of the display (700). The fourth section (712-3) has been reserved for messages that are either not categorized, or are not determined to be presented in their category.

As mentioned above, the displaying system determines, based on the percentage identified, at least one of the categorized message to present in the portion (710) of the display (700). The portion (710) of the display (700) is capable of presenting ten categorized messages. Sixty percent of the categorized messages can be presented in the first section (712-1). As a result, the first section (712-1) presents six categorized messages associated with category A in the portion (710) of the display (700). Twenty percent of the categorized messages can be presented in the second section (712-2). As a result, the second section (712-2) presents two categorized messages associated with category B in the portion (710) of the display (700). Ten percent of the categorized messages can be presented in the third section (712-3). As a result, the third section (712-3) presents one categorized message associated with category C in the portion (710) of the display (700). Ten percent of the messages can be presented in the fourth section (712-4) of the portion (710) of the display (700). The fourth section (712-4) is identified for messages that are not determined to be displayed in their categorized category or are not categorized to any category. As a result, one hundred percent of the display is consumed by categorized messages. Message one (701-1), message two (701-2), message three (701-3), message seven (701-7), message eight (701-8), and message nine (701-9) have been categorized to category A, and are determined to be presented. Message eight (701-8) is categorized to both category A and category B and is determined to be presented as part of category A in the first section (712-1). Message four (701-4) and message five (701-5) have been determined to be presented as part of category B in the second section (712-2). Message ten (701-10) is determined to be presented as part of category C in the third section (712-3). Message six (701-6) was not determined to be presented as part of category B in the fourth section (712-4). Message six (701-6) is determined to be presented as part of the group of messages that was not determined to be presented with their categorized category or were not assigned to a category.

As mentioned above, the displaying system presents, in the portion (710) of the display (700), at least one of the categorized messages. As illustrated, message one (701-1), message two (701-2), message three (701-3), message seven (701-7), message eight (701-8), and message nine (701-9) are presented together in a first section (712-1). Message four (701-4) and message five (701-5) are presented together in the second section (712-2). Message ten (701-10) is presented in the third section (712-3). Message six (712-6) is presented in a fourth section (712-4).

Figure 8:
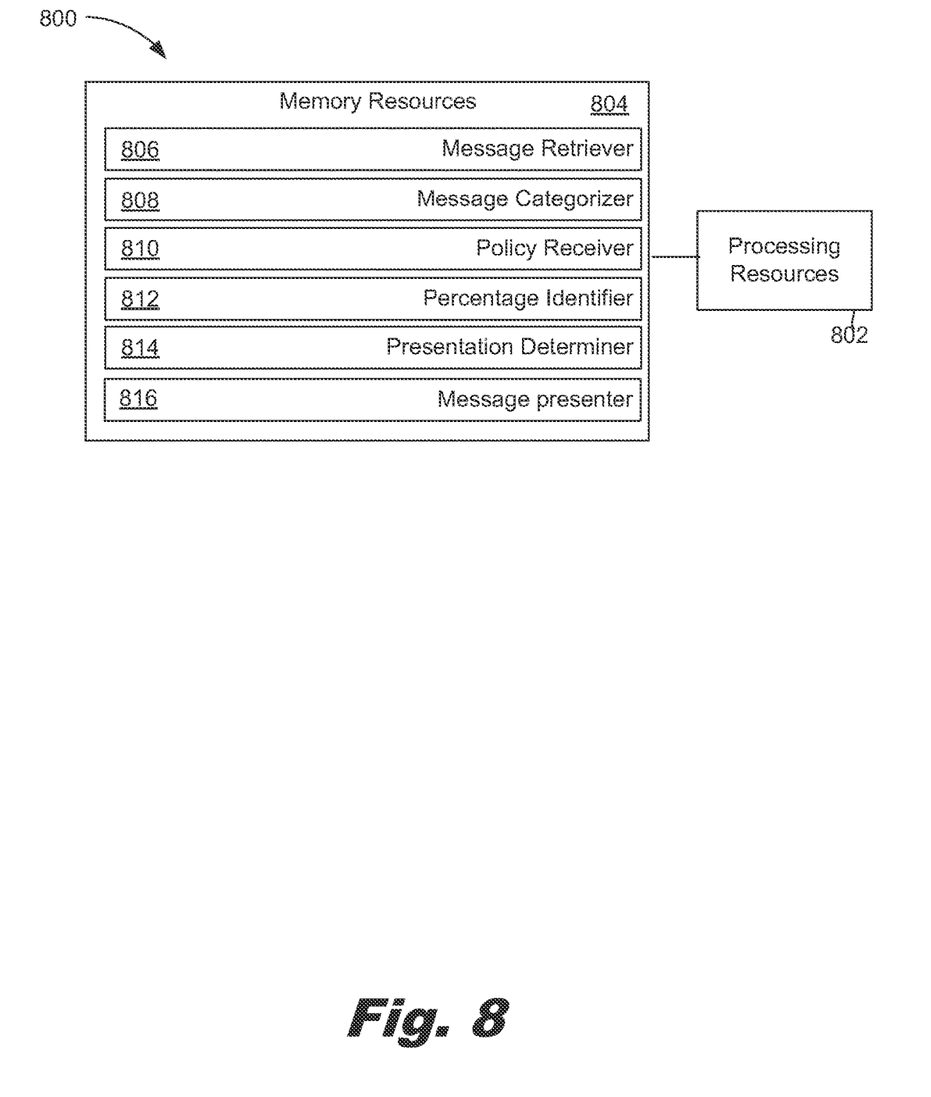
FIG. 8 is a diagram of an example of a system for displaying at least one categorized message based on a percentage, according to the principles described herein.

FIG. 8 is a diagram of an example of a displaying system (800), according to the principles described herein. In this example, the displaying system (800) includes processing resources (802) that are in communication with memory resources (804). Processing resources (802) include at least one processor and other resources used to process programmed instructions. The memory resources (804) generally represent any memory capable of storing data, such as programmed instructions or data structures used by the notifying system (800). The programmed instructions shown stored in the memory resources (804) include a message retriever (806), a message categorizer (808), a policy receiver (810), a percentage identifier (812), a presentation determiner (814), and a message presenter (816).

The memory resources (804) include a computer readable storage medium that contains computer readable program code to cause tasks to be executed by the processing resources (802). The computer readable storage medium may be a tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, other types of memory, or combinations thereof.

The message retriever (806) represents programmed instructions that, when executed, cause the processing resource (802) to retrieve a number of messages. The message categorizer (808) represents programmed instructions that, when executed, cause the processing resource (802) to categorize the number of messages into a number of categories to create categorized messages.

The policy receiver (810) represents programmed instructions that, when executed, cause the processing resource (802) to receive a policy, the policy representing information related to a percentage. The percentage identifier (812) represents programmed instructions that, when executed, cause the processing resource (802) to identify the percentage, the percentage representing the portion of the display utilized for displaying the at least one category associated with the categorized message.

The presentation determiner (814) represents programmed instructions that, when executed, cause the processing resource (802) to determine, based on the percentage, at least one of the categorized messages to present in the portion of the display. The message presenter (816) represents programmed instructions that, when executed, cause the processing resource (802) to present, in the portion of the display, the at least one of the categorized messages.

The displaying system (800) of FIG. 8 may be part of a general purpose computer. However, in alternative examples, the displaying system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting.

As used herein, the singular forms "a," "an" and "the" are intended to include the plural forms as well, unless the context clearly indicates otherwise. It will be further understood that the terms "comprises" and/or "comprising," when used in the specification, specify the presence of stated features, integers, operations, elements, and/or components, but do not preclude the presence or addition of a number of other features, integers, operations, elements, components, and/or groups thereof.

What is claimed is:

1. A method for displaying at least one categorized message based on a percentage, the method comprising:
   with a processor:
   receiving a policy, the policy comprising multiple categories and a corresponding percentage for each category;
   receiving a plurality of messages;
   categorizing the plurality of messages into the multiple categories to create categorized messages;
   presenting in a first portion of a display, a categorized message of a first category and presenting less than all of the messages categorized in the first category in the first portion of the display based on limitation of the first portion of the display which is proportional to the corresponding percentage for the first category; and
   presenting, in a second portion of the display, a categorized message of a second category and presenting less than all the messages categorized in the second category in the second portion of the display based on limitation of the second portion of the display which is proportional to the corresponding percentage for the second category, wherein categorized messages of the first and second categories are presented in different, visually-distinct text and the categories are presented in the display by their percentages.

2. The method of claim 1, in which receiving the plurality of messages comprises receiving the plurality of messages for a specific time period.

3. The method of claim 1, in which presenting, in the first portion of the display, further comprises ordering multiple displayed messages of the first category based on a timestamp.

4. The method of claim 1, further comprising presenting a message of a third category in a third portion of the display, wherein the third portion of the display is proportional to the corresponding percentage for the third category.

5. The method of claim 1, wherein a message is categorized into both the first category and the second category.

6. The method of claim 5, wherein the message categorized into both the first category and the second category is presented in both the first portion and the second portion.

7. The method of claim 1, wherein categorization is based on a sender of the message.

8. The method of claim 1, wherein the categorization is based on a subject line of the message.

9. The method of claim 1, wherein categorized messages of the first and second categories are presented in different, visually-distinct text.

10. The method of claim 9, wherein the visually-distinct text includes different fonts.

11. The method of claim 9, wherein the visually-distinct text includes different colors of text.

12. A method for displaying categorized messages, the method comprising:
    with a processor:
    receiving a plurality of messages;
    receiving a policy comprising multiple categories and a corresponding percentage for each category;
    categorizing the plurality of messages into the multiple categories based on subject matter of the messages to create categorized messages, wherein a first message is categorized into both a first category and a second category; and
    presenting the categorized messages in a display grouped by category, wherein a portion of the display allocated to display a category is proportional to the corresponding percentage for the category from the policy and the categories are presented in the display by their percentages.

13. The method of claim 12, wherein the categorized messages are secondarily sorted by timestamp.

14. The method of claim 12, wherein categorizing the plurality of messages into the multiple categories is further based on sender.

15. The method of claim 12, wherein the percentages in the policy are dependent upon the size of the display.

16. A method for displaying categorized messages, the method comprising:
    with a processor:
    receiving a policy, the policy comprising multiple categories and a corresponding percentage for each category, wherein a category comprises a subject matter;
    receiving a plurality of messages;
    categorizing the plurality of messages into the multiple categories based on subject matter of each message to create categorized messages; and
    presenting the categorized messages in a display, the categorized messages grouped by category and each category occupying the corresponding percentage from the policy of the display, wherein each displayed category is visually distinct and the categories are presented in the display by their percentages.

17. The method of claim 16, wherein categorizing the plurality of messages into the multiple categories further comprises using sender information to categorize the plurality of messages.

18. The method of claim 16, further comprising sorting messages within displayed categories by at least one of: timestamp, priority, sender, and read/unread status.

* * * * *